Jan. 8, 1952        E. L. BURWELL        2,581,628

MOUSE AND RATTRAP WITH IMPROVED BAIT HOLDER

Filed May 19, 1950

Earl L. Burwell

INVENTOR.

UNITED STATES PATENT OFFICE 2,581,628

MOUSE AND RATTRAP WITH IMPROVED BAIT HOLDER

Earl L. Burwell, Warsaw, Ind.

Application May 19, 1950, Serial No. 162,868

3 Claims. (Cl. 43—81)

The present invention relates to certain new and useful improvements in traps which are commonly referred to as mouse and rat traps and has more particular reference to novel bait holding and trigger releasing means.

Mouse and rat traps which are primarily adapted for use in the home and elsewhere may be generically construed as characterized by a rectangular or equivalent horizontal base, a mouse actuated bait holding trip, or equivalent catch on said base, and a finger-like trigger which is hingedly mounted at one end on the base and which has its free end releasably engageable with the trip and which is adapted to reach over and hold down a spring actuated impact frame usually hinged for operation on the central portion of the base.

Many and varied efforts and attempts have been put forth to improve the trip action of such traps and to locate the bait holding means in a more advantageous position and to off-set the act of an animal stealing the bait without tripping the trap. The present invention falls in the latter category in that it has to do with an animal actuated treadle which is hinged on the base and which is provided with a bait holder which is virtually inaccessible lest the victim steps on the treadle. Further novelty has to do with the fact that the bait holder also serves as a keeper for the releasable end of the trigger latch.

More specifically, the improvement has to do with a simple and practical rectangular plate which constitutes the treadle and which latter is hinged in place on the base, said plate being provided adjacent its hingedly anchored edge with an open ended relatively small tube which is rigid with the plate and which serves not only as an aptly suitable bait holder but as a keeper or catch for the trippable free end of a common form of trigger latch.

Other objects and advantages will become more readily apparent from the following description and the accompanying illustrative drawings.

In the accompanying sheet of drawings, wherein like numerals are employed to designate like parts throughout the views.

Figure 1:
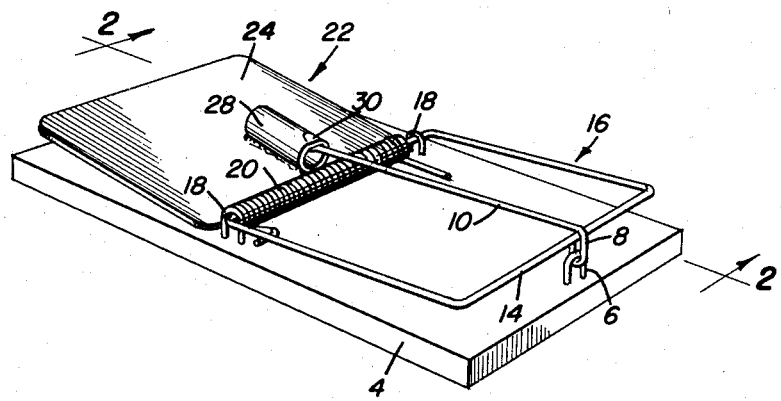
Figure 1 is a perspective view of a mouse and/or rat trap constructed in accordance with the principles of the present invention showing the trap set.
Figure 2:
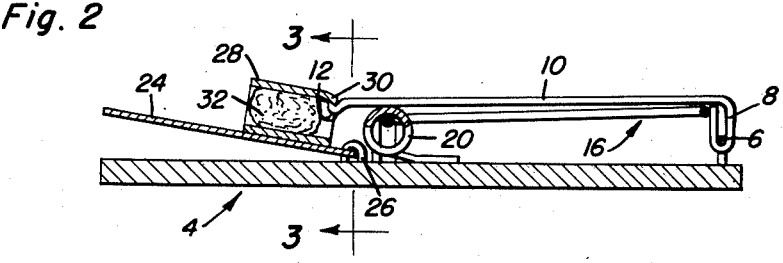
Figure 2 is a longitudinal section on the line 2—2 of Figure 1, looking in the direction of the arrows; and, Figure 3 is a section at right angles on the transverse line 3—3 of Figure 2, looking in the direction of the arrows.
Figure 3:
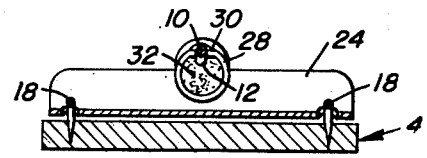

Referring now to the drawings by distinguishing reference numerals the rectangular board or base is denoted by the numeral 4. At one end and adjacent the marginal edge is a staple 6 to which the customary bent eye 8 of the trigger latch or finger 10 is connected. The free end of the trigger latch has a hooked detent 12 as perhaps best shown in Figure 2. This essentially L-shaped trigger latch serves in a customary manner to reach over and hold-down the bight 14 of the customary wire impact or striker frame 16. The striker frame is hinged on the base by way of staples or the like 18—18 having associated therewith the customary coiled throw spring 20. These are obviously old features in a trap construction.

The improvement has to do with the treadle and bait holding means 22. Broadly, this means comprises an animal actuated treadle and bait holding receptacle. Specifically, it comprises a substantially rectangular treadle forming plate 24 which is rectangular and approximately equal in area to that portion of the base which underlies the plate. The plate is imperforate and flat and is hingedly mounted along one marginal edge on attaching staples 26 which are driven into the base board. The bait holder is an open ended sleeve 28 having one end portion indented and bent as at 30 to provide a keeper for the detent 12. The bait is denoted at 32. It will be noted that the bait holding receptacle or sleeve is close to the hinged marginal edge of the treadle plate and one open end is therefore readily available to accommodate the detent hook 12.

In practice it has been found desirable to load the bait into the sleeve or receptacle 28 much as shown in the drawings. That is to say, it is better to pack the bait within the confines of the sleeve so that it will not be too easily accessible to the prospective victim. Since the bait is so situated on the treadle it is a foregone conclusion that in order to get at the bait the victim will most assuredly step on some portion of the treadle plate and, in so doing, he will spring the trap and will be caught.

A trap when constructed as herein shown and described has proved out to be aptly suited for intended purposes, safe and easy to set and greatly increases the likelihood that each and every potential victim becomes an assured catch with a minimum of bait loss possibilities.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. An attachment for a rat trap of the class shown and described comprising a substantially rectangular treadle forming plate provided on one marginal edge portion with apertures and coacting and hinging staples and also provided adjacent said one marginal edge portion with a bait holding sleeve which is wholly open at opposite ends, one end of said sleeve having a bent indentation providing a keeper for a co-acting end portion of a trigger latch.

2. A trap of the class described comprising a flat surfaced base, a spring closed animal striker frame having one end portion hingedly mounted on a central portion of said base and swingable toward and from the base, a substantially rectangular flat treadle plate, the latter being imperforate and having apertures adjacent one marginal edge portion, staples coacting with said openings and fastened to said base and hingedly attaching the plates to the base, an open ended bait holding tube superimposed on said plate and fastened to said plate, said tube being provided at one end with a keeper, and a trigger latch hingedly mounted at one end on a corresponding end of the base and having a free end formed with a detent, said detent being releasably engageable with said keeper.

3. The structure specified in claim 2 wherein said keeper is formed by a bent indentation at one end of the tube.

EARL L. BURWELL.

REFERENCES CITED

The following references are of record in the file of this patent:

UNITED STATES PATENTS

| Number | Name | Date |
|---|---|---|
| 1,345,137 | Cowel | June 29, 1920 |
| 1,464,559 | Britan | Aug. 14, 1923 |

FOREIGN PATENTS

| Number | Country | Date |
|---|---|---|
| 578,428 | Great Britain | June 27, 1946 |